United States Patent [19]

Suzuki et al.

[11] 4,430,274
[45] Feb. 7, 1984

[54] CARBURETOR AND METHOD FOR AN INTERNAL COMBUSTION ENGINE

[75] Inventors: Mikio Suzuki, Zushi; Masafumi Yamazaki, Yokosuka, both of Japan

[73] Assignee: Nissan Motor Company, Limited, Yokohama, Japan

[21] Appl. No.: 346,743

[22] Filed: Feb. 8, 1982

[30] Foreign Application Priority Data

Feb. 9, 1981 [JP] Japan .................. 56-17866

[51] Int. Cl.³ .......................................... F02M 25/14
[52] U.S. Cl. .................................. 261/18 B; 261/67; 261/69 R; 123/575
[58] Field of Search ............... 261/18 B, 67; 123/575; 261/69 R

[56] References Cited

U.S. PATENT DOCUMENTS

| | | | |
|---|---|---|---|
| 2,039,990 | 5/1936 | Gustafsson | 261/18 B |
| 2,930,432 | 3/1960 | Engstrom | 261/18 B |
| 3,805,756 | 4/1974 | Madariaga | 261/18 B |
| 4,031,864 | 6/1977 | Crothers | 123/575 |
| 4,052,490 | 10/1977 | Fedison | 261/67 |
| 4,085,720 | 4/1978 | Etoh | 261/18 B |

FOREIGN PATENT DOCUMENTS

| | | | |
|---|---|---|---|
| 2806657 | 8/1978 | Fed. Rep. of Germany | 261/18 B |
| 7712689 | 5/1979 | Netherlands | 123/575 |

*Primary Examiner*—Tim R. Miles
*Attorney, Agent, or Firm*—Schwartz, Jeffery, Schwaab, Mack, Blumenthal & Koch

[57] ABSTRACT

A carburetor for an internal combustion engine includes a power boost device for boosting engine output during acceleration or at high speeds which adjusts its air-fuel ratio and/or boost timing according to the alcohol content of the fuel. The power device includes a nitrile rubber swelling member which swells in accordance with fuel alcohol content and which is used to adjust the fuel flow aperture of a power jet. In addition, a second swelling member can be used as a linkage between an intake manifold-vacuum-responsive piston and a metering valve to adjust the timing or threshold vacuum level at which the metering valve begins to operate.

16 Claims, 11 Drawing Figures

CARBURETOR AND METHOD FOR AN INTERNAL COMBUSTION ENGINE

BACKGROUND OF THE INVENTION

The present invention relates to a carburetor for an internal combustion engine and more particularly to a power boost device for a carburetor which increases the flow rate of fuel during acceleration or at high speeds.

In a prior art carburetor for an internal combustion engine, when a mixture of gasoline and a non-hydrocarbon fuel such as alcohol is used as an alternative fuel, the required i.e., stoichiometric air-fuel ratio decreases relative to that required for pure gasoline fuel as the ratio of alcohol to gasoline increases, and operation of the engine at the air-fuel ratio suitable for pure gasoline feed degrades engine response, particularly during acceleration or at high speeds and increases exhaust emission of NOx and HC.

SUMMARY OF THE INVENTION

It is an object of the present invention to provide a power boost device for a carburetor for an internal combustion engine such that when the fuel mixture contains a non-hydrocarbon such as alcohol, the air-fuel ratio is decreased so as to a produce stoichiometric operation of the engine, thereby preventing deterioration of engine response of the vehicle, particularly during acceleration or at high speeds, and preventing increases in exhaust emission of NOx and HC.

The present invention relates to a carburetor for an internal combustion engine. The carburetor includes a power boost device wherein a power valve opens when engine intake vacuum exceeds a threshold value to increase the flow of fuel supplied to a venturi. The power valve includes a member which swells to an extent depending on the ratio of gasoline to alcohol in the fuel mixture. The flow of fuel passing through the power valve is regulated in accordance with the extent of swelling of the member.

According to the present invention, there is provided a method of operating an internal combustion engine for running on gasoline fuel or a mixture of gasoline and alcohol fuel comprising the step of decreasing the air-fuel ratio in dependence upon increases in the alcohol content of said fuel.

According to the present invention, there is provided a power boost device for a carburetor of an internal combustion engine which can be fueled by either pure gasoline or an alcohol-gasoline mixture, comprising: a valve responsive to intake manifold vacuum pressure and cooperative with an orifice to permit fuel flow therethrough when intake vacuum pressure exceeds an threshold value, said valve being responsive to the alcohol content of the fuel to adjust the amount of fuel passing therethrough.

BRIEF DESCRIPTION OF THE DRAWINGS

The above and other objects, features and advantages of the present invention will be apparent from the following description of a preferred embodiment thereof, taken in conjunction with the accompanying drawings in which.

DETAILED DESCRIPTION OF THE PREFERRED EMBODIMENTS

Figure 1:
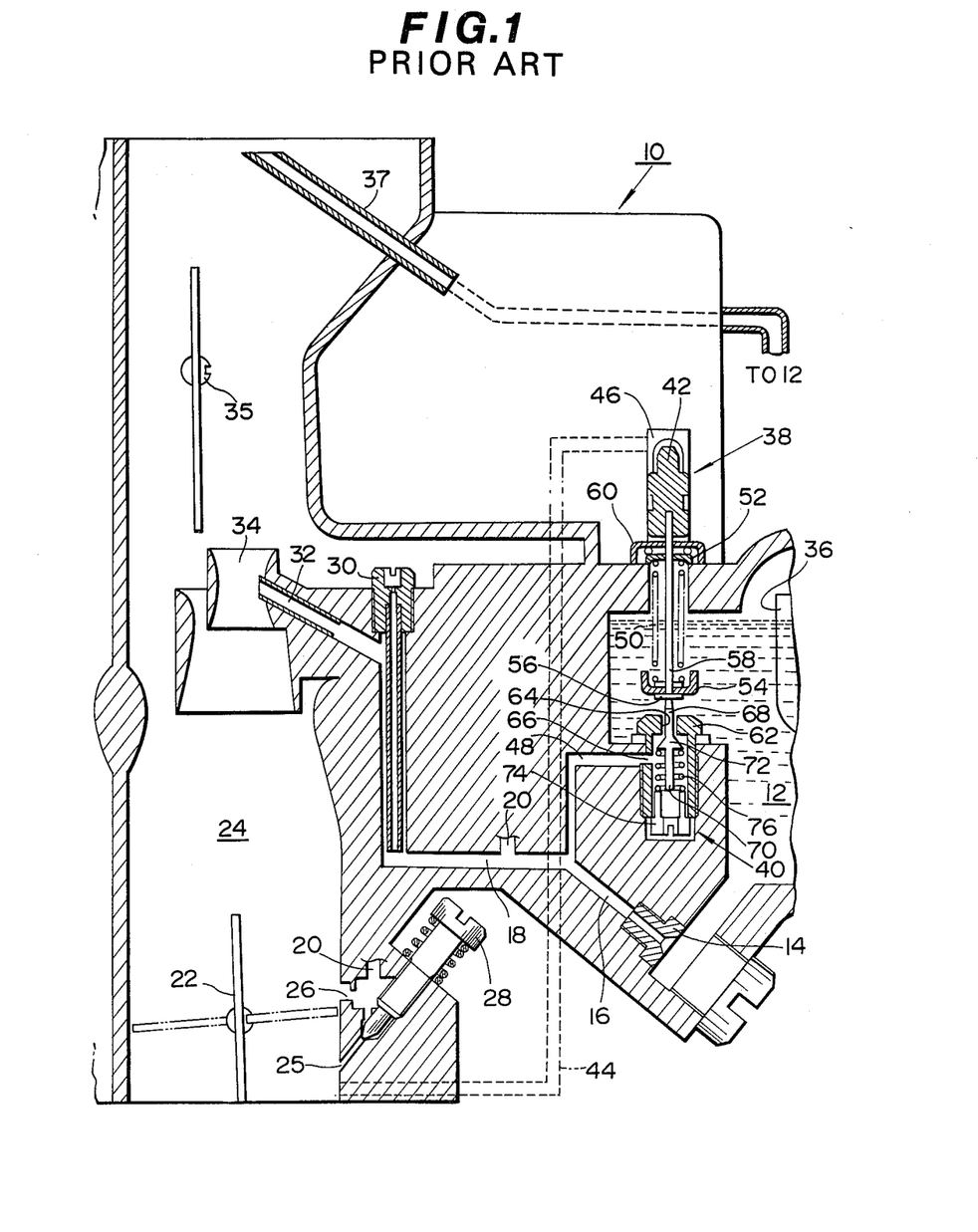
FIG. 1 is a cross-section view of a prior art carburetor.

To facilitate understanding of the present invention, a prior art carburetor 10 will be described with reference to FIG. 1. Fuel from a float chamber 12 is metered by a main jet 14 into a fuel passageway 16 which is divided into a main fuel passageway 18 and a slow fuel passageway 20. When a throttle valve 22 in an intake manifold 24 is close to being closed, fuel flows into the slow fuel passage 20. during idling (when the throttle valve 22 is in a position shown by phantom line), fuel is fed from an idle port 25 into the intake manifold; otherwise, fuel enters the intake manifold from a slow port 26, which communicates with the slow fuel passageway 20. An adjustment screw 28 controls fuel flow through the idle port 25 to the manifold 24.

When the throttle valve 22 is opened relatively wide, fuel flows through the main fuel passageway 18 and is mixed with air drawn in through a main air bleed 30 and drawn into the intake manifold 24 through a main nozzle 32 by vacuum pressure in a venturi 34. A conventional choke valve 35 is disposed above the venturi 34 within the intake manifold, and a conventional air vent nozzle 37 is open above the chalk valve in the intake manifold and communicates with the float chamber 12. Reference numeral 36 denotes a float supported by the fuel within the float chamber 12.

With such a carburetor, the arrangement is such that fuel consumption is most efficient during normal operation of the carburetor, but the stoichiometric air-fuel ratio does not provide maximum output power. Thus when the opening of the throttle valve 22 is relatively large, i.e. during acceleration or at high speeds, an extra amount of fuel must be fed to the engine to decrease the air-fuel ratio.

This function is performed by a vacuum power boost device 38 which includes a power valve 40, a vacuum piston 42 which operates the power valve 40 in accordance with the vacuum pressure exerted on the piston 42, a boost passageway 44 which conducts the intake vacuum pressure to the piston 42 accommodated within a piston bore 46 and a power passageway 48 which can supply an additional amount of fuel from the power valve 40 to the main fuel passageway 18. When the engine is at rest, the vacuum piston 42 is pulled down by a coil spring 50 disposed between upper and lower support stops 52 and 54. The upper support stop 52 is fixed to the upper wall of the float chamber 12 while the lower support stop 54 is supported by a flange 56 fixed to the lower end of a piston rod 58, the upper end of which is fixed to the vacuum piston 42. The piston 42 and the rod 58 are vertically movable together through the fixed upper support stop 52 and a seal plate 60 defining the bottom of the piston bore 46. The power valve 40 includes a hollow cylindrical casing 62 which has an upper reduced opening 64 and a lateral opening 66 communicating with the power passageway 48. It also includes a valve member 68 which includes a rod 70 movable through the reduced opening 64, and a boss 72 housed within the inner space of the cylindrical member 62. The power valve further includes a spring holder 74 disposed within the cylindrical casing 62 and a coil spring 76 biasing the valve member 68 upward. When high vacuum pressure is exerted against the top of the piston 42, the piston as well as the piston rod 58 moves upward against the action of the coil spring 50, and the valve member 68 is also moved upward by the action of the coil spring 76 so that the boss 72 of the valve member 68 is urged into sealing contact with the reduced opening 68 of the cylindrical casing 62. In this case, a predetermined spacing is realized between the flange 56 of the piston rod 58 and the upper end of the valve member 68 so that the piston 42 will not be pushed down until downward pressure exceeding a predetermined value is exerted on the piston 42, i.e., until the downward force on the piston 42 due to the spring 50 exceeds the upward force on the piston 42 due to the intake pressure in the intake passage 24.

When the engine starts, high intake vacuum acts on the upper surface of the vacuum piston 42 so that the piston 42 and the piston rod 58 are pulled upward against the action of the coil spring 50. Thus the valve member 68 moves upward to shut off the reduced opening 64 due to the action of the return spring 76 of the power valve 40.

As engine load increases and the vacuum in the intake passage 24 gradually decreases, the vacuum exerted on the upper surface of the vacuum piston 42 also gradually decreases. As a result, when the downward force of the coil spring 50 exceeds the upward vacuum pressure exerted on the piston 42, the piston rod 58 and flange 56 move downward making contact with rod 70 and forcing valve member 72 downward. This causes the float chamber 12 to communicate with the fuel passage 48 via the annular passage formed between the valve member 68 and the internal surface of the upper opening 64 in the power valve, the internal chamber of the cylindrical casing 62, and the power passageway 48, thereby permitting fuel to flow therethrough. Thus the fuel metered by the power jet 14 passes through the passage 16 to merge at the main fuel passage 18 with the fuel from the power passage 48. This decreases the air-fuel ratio and in turn increases engine power output.

Figure 2:
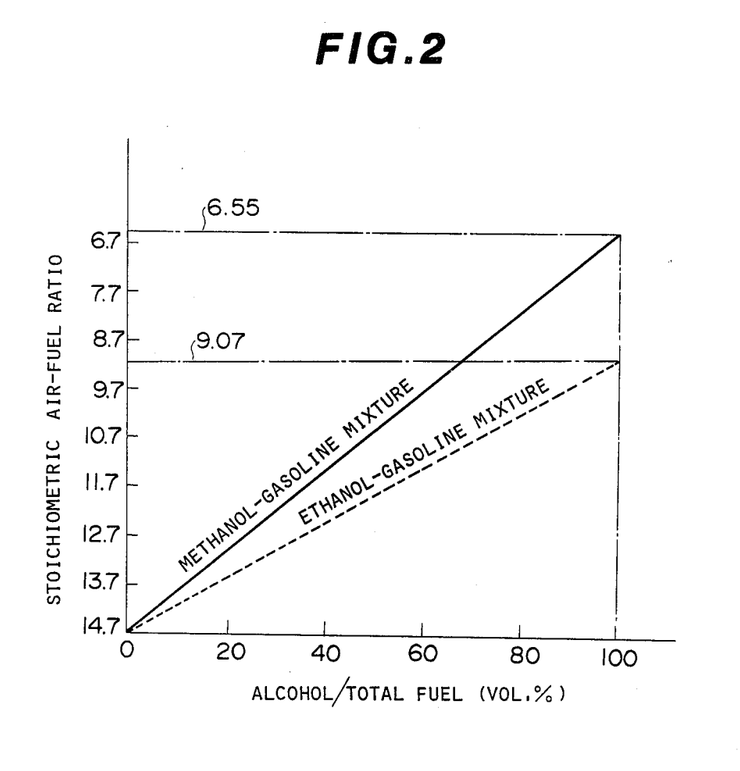
FIG. 2 is a graph showing the relationship between alcohol content in different fuel mixtures and air-fuel ratio.

However, this decrease in air-fuel ratio may be insufficient for a fuel mixture of gasoline and alcohol. As shown in FIG. 2, as the alcohol content of such a fuel mixture increases, the stoichiometric air-fuel ratio also decreases. The stoichiometric air-fuel ratio for pure gasoline fuel is illustrated as 14.7 in FIG. 2. Therefore, in order to adapt a standard pure-gasoline engine to a gasoline/alcohol fuel mixture without deleterious effects on engine response or exhaust emissions at high loads, it is necessary to reduce the air-fuel ratio according to increases in the alcohol content of the fuel mixture.

Figure 3:
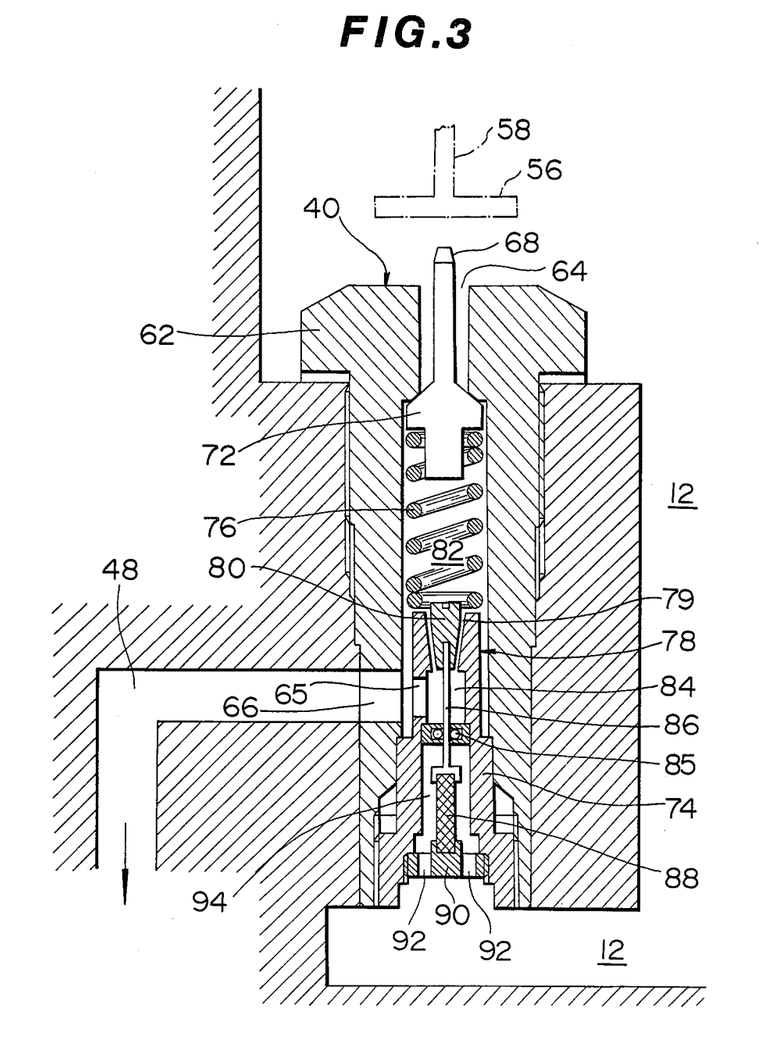
FIG. 3 is an enlarged cross-section view of a power valve of a power boost device of a carburetor according to the present invention.

Referring to FIG. 3, there is shown the power valve of a vacuum power boost device according to the present invention. The reference numerals of FIG. 1 are used to designate parts of the power valve similar to those of FIG. 1. Other structural portions of the carburetor incorporating the present invention which are not shown are the same as those of the carburetor of FIG. 1 so that these need not be described again. The power valve 40 contains a valve member 68 similar to the valve member 68 of FIG. 1, in a hollow substantially-cylindrical valve casing 62 and a power jet 78 disposed coaxially in the valve casing 62. A coil spring 76 disposed between the valve member 68 and a holder 74, which also constitutes the housing of the power jet 78, biases the valve member 68 upward.

Figure 4:
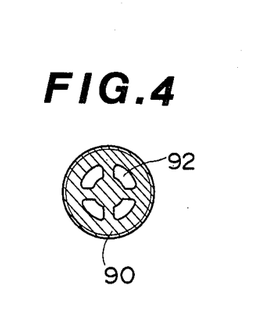
FIG. 4 is a plan view of a fixing ring used in the power valve of FIG. 3.
Figure 5:
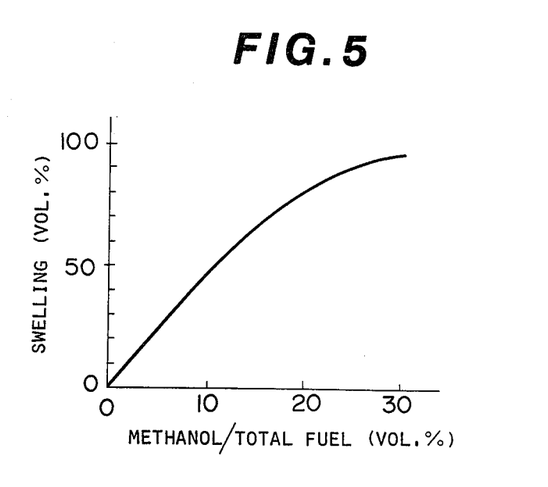
FIG. 5 is a graph of the relationship between alcohol content in fuel and swelling of a swelling member.
Figure 6:
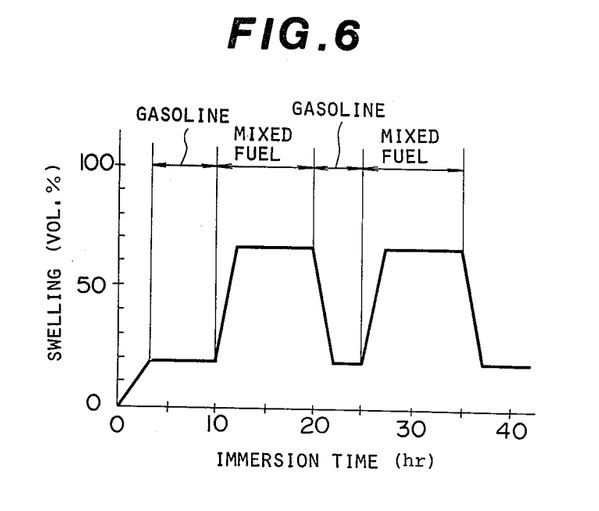
FIG. 6 is a graph of the relationship between swelling and fuel immersion time for an exemplary fuel composition history.

The power jet 78 includes a hollow substantially-cylindrical holder or housing 74 disposed coaxially with the hollow valve casing 62. The holder 74 is secured at its lower end to the valve casing 62 and has a side opening 65 which communicates via an opening 66 in the valve casing 62 with the power passageway 48. The holder 74 has an upper opening 79, enlarging toward the valve member 68, which can sealingly support an additional valve member 80, complementary in configuration to the upper opening 79. The second valve member 80 is vertically movable so as to form a passage through which an upper chamber 82 located above the power jet 78 can communicate with an intermediate chamber 84 located opposite the opening 65 and above a seal 85 which sealingly partitions the interior of the holder 74. A rod 86 is secured at its upper end to the second valve member 80 and is supported near its center by the seal 85. The rod 86 is also connected at its lower end to an upper end of a swelling member 88 strip-like in cross-section, the other end of which is supported by a fixing ring 90, shown in FIG. 4. The ring 90 is secured to the lower internal surface of the holder 74 and allows fuel to pass through holes 92 provided therein between the float chamber 12 and a lower chamber 94 defined by the seal 85, the holder 74 and the ring 90. Thus, the swelling member 88 is immersed in fuel from the float chamber 12. The cross-sectional opening area formed between the second valve member 80 and the opening 79 internal surface of the power jet 78 when the valve member 80 is lifted to its highest position is designed so as to be smaller than the cross-sectional area of the power passage 48. The swelling member 88 is made of nitrile rubber (NBR) and swells appreciably when immersed in alcohol. In the particular embodiment, the swelling member 88 swells in direct relation to the alcohol content of a mixture of gasoline and alcohol (methanol), as shown in FIG. 5. The swelling member 88 swells rapidly when immersed in the mixture of gasoline and alcohol (methanol), and then rapidly shrinks or contracts when the fuel in which the swelling member is immersed changes from a mixture of alcohol and gasoline to pure gasoline, as shown in FIG. 6. FIG. 6 shows the behavior of the swelling member 88 when alternately immersed in gasoline and a fuel mixture called M15 which includes gasoline and 15% methanol by volume. The swelling characteristics of the swelling member 88 can be changed by changing the content of alcohol in the fuel mixture.

In operation, since the swelling member 88 is immersed in fuel from the float chamber 12, if the fuel is a mixture of alcohol and gasoline, the swelling member 88 swells according to the alcohol content. As the swelling member expands upwards in FIG. 3, it pushes the second valve member 80 upward and increases the cross-sectional area of the passage formed between the opening 79 and the second valve member 80, the passage thereby metering the flow of fuel through the power jet 78. Analogously with FIG. 1, the flow of fuel entering the power passageway 48 via the space between the valve member 68 and the reduced opening 64 due to the actuation of the vacuum piston 42 (FIG. 1) increases so that the air-fuel ratio decreases when the power valve 40 operates.

Generally speaking, remarkably deteriorated engine response and a remarkably increased amount of $NO_x$ emission due to increased air-fuel ratio occur during acceleration or high load states in which the vacuum power device 38 operates. The particular embodiment according to the present invention decreases the air-fuel ratio employed to produce stoichiometric operation of the engine when the vehicle accelerates or runs at high speeds. Thus, engine response is improved and NOx exhaust emission is greatly reduced.

Figure 7A:
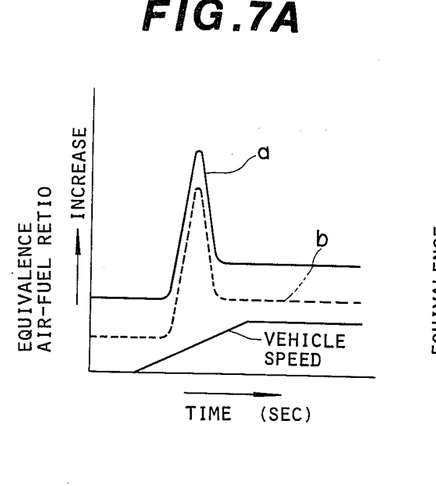
FIGS. 7A, B, C, and D are graphs of the relationship between the equivalence ratio and elapsed time during acceleration.
Figure 7B:
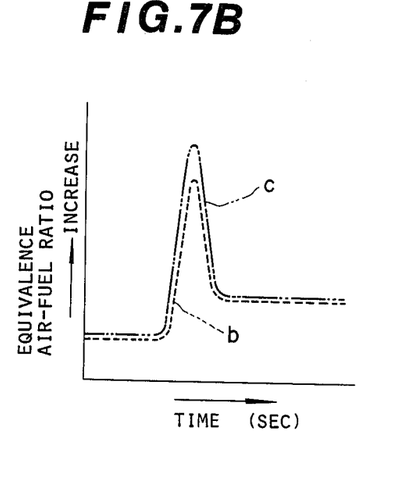

FIGS. 7A–7D show graphs of the equivalence air-fuel ratio as a function of time during vehicle acceleration. The equivalence air-fuel ratio is defined as the ratio of the stoichiometric air-fuel ratio to the actual air-fuel ratio. In FIG. 7A, the solid curve a shows the equivalence air-fuel ratio characteristic in a prior art engine in which the fuel is pure gasoline and the vehicle is accelerating, and the broken curve b shows the corresponding characteristic for a fuel mixture of gasoline and alcohol. In FIG. 7B, the two-dotted broken line c shows the corresponding mixed-fuel characteristic according to the present inention. It can be seen in FIG. 7B that the timing of the power valve 20 is the same as that according to the prior characteristic b, but that the equivalence air-fuel ratio characteristic obtained when the valve is opened to its maximum is corrected so as to substantially equal the characteristic a of FIG. 7A for pure gasoline.

Figure 8:
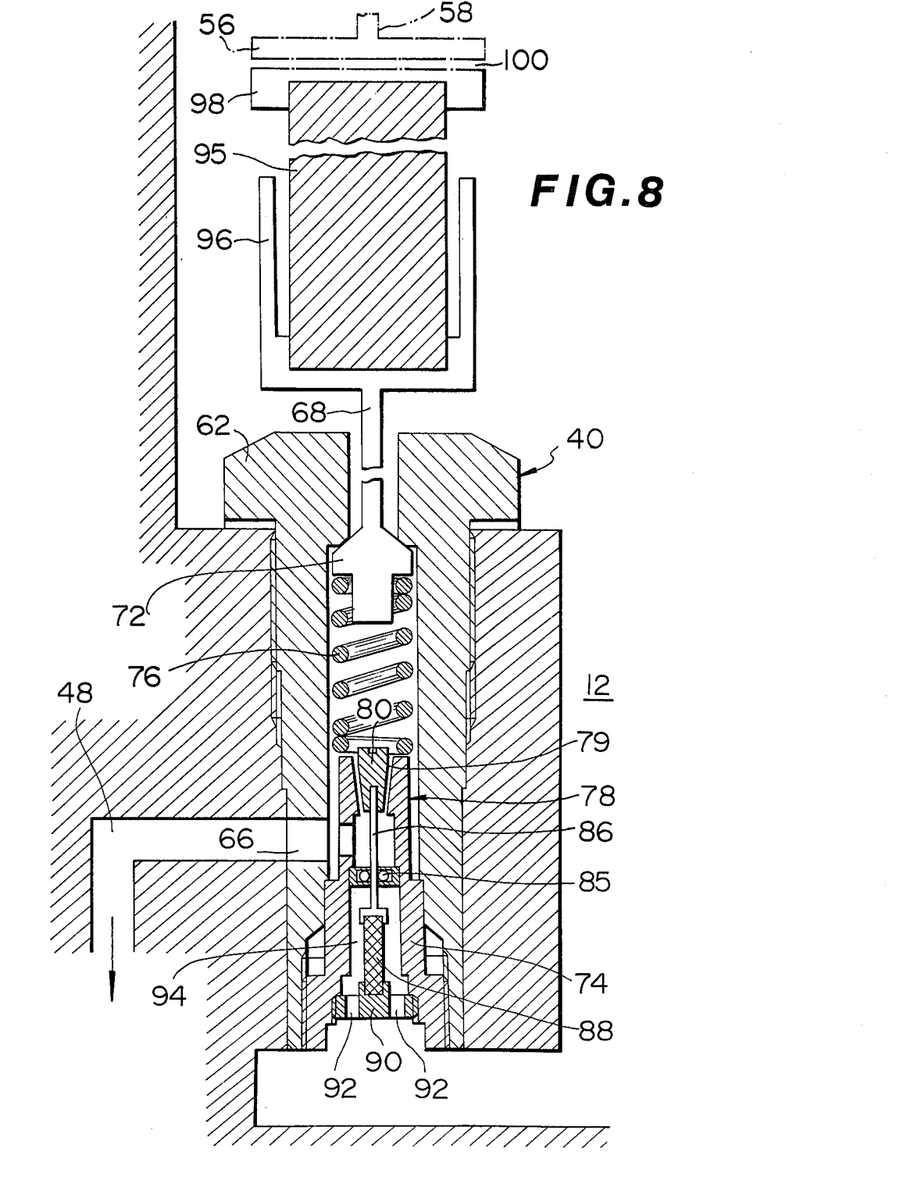
FIG. 8 is a view, similar to FIG. 3, of a modification of the present invention.

Referring to FIG. 8, there is shown a modification of the present invention. This structure is the same as in the embodiment of FIG. 3 except that the drive portion of the power valve 40 also includes a swelling member 95 adapted to be immersed in fuel within the float chamber 12. More particularly, a guide 96, having a U-shaped cross-section, is formed integrally on the upper end of the valve member 68. The swelling member 95 is secured at its lower end to the bottom of the guide 96 and at its upper end to a reinforcement plate 98 which is parallel to and spaced slightly from the flange 56 secured to the lower end of the piston shaft 58, as shown in FIG. 1. The predetermined spacing 100 between the plate 98 and the flange 56 is selected to equal the spacing, not shown, given in the power device in FIG. 1 when high vacuum is exerted over the top of the piston 42 and when the fuel used is pure gasoline, but it is reduced to some extent when a mixture of gasoline and alcohol is used due to swelling of the swelling member.

In operation, when the swelling member 95 swells due to the use of a mixture of gasoline and alcohol, the spacing between the flange 56 and the plate 98 is reduced so that the timing when the flange 56 and the plate 98 contact is advanced. This advances the timing, as shown by the dotted-line d in FIG. 7C, when the power valve 40 opens, compared with the conventional characteristic b, so that the region in which the fuel quantity is increased, which is the essential function of the power valve 40, further increases, thereby decreasing the actual air-fuel ratio, especially at the beginning of acceleration. The decrease of the actual air-fuel ratio results in an increase in the equivalence ratio as shown in FIG. 7C.

Figure 7C:
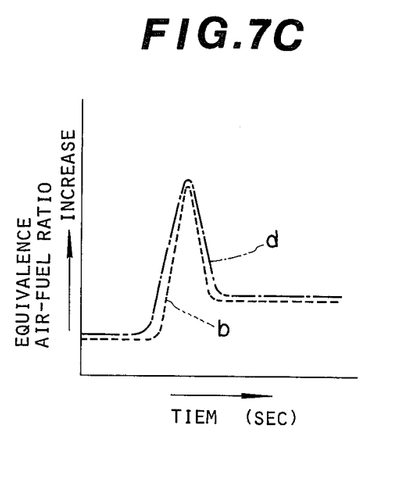
Figure 7D:
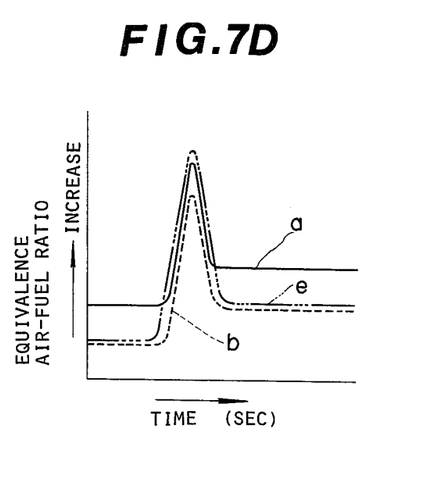

At the same time, the swelling member 88 of the power jet 78 swells so that the level of the entire equivalence air-fuel ratio characteristic changes, as shown by broken line e in FIG. 7D. That is, the equivalence air-fuel ratio characteristic obtained when both the swelling members 95 and 88 swell is shown as the synthesis of the FIGS. 7B and 7C characteristics c and d respectively. This provides a substantially constant decrease in the actual air-fuel ratio increase in the equivalence ratio from the early acceleration step to the later acceleration step.

Although the swelling member 95 of the valve drive system is preferably used along with the power jet swelling member 88, it can be used alone to decrease the air-fuel ratio to increase the equivalence ratio in order to realize the characteristic d of FIG. 7C.

In the embodiment and modification of the present invention described above, if the fuel used is pure gasoline, the swelling characteristic of the swelling member 88 or 95 is negligible so that the conventional power increase characteristic as shown at a in FIG. 7A is realized.

As will be appreciated from the above description, according to the present invention, the flow of fuel passing through the power valve is changed depending on the extent of swelling of the swelling members to control the air-fuel ratio. Thus, even an engine intended for use with pure-gasoline fuel can use a mixture fuel of gasoline and alcohol by decreasing the air-fuel ratio, so that deterioration of engine response, especially during acceleration and at high speeds, is prevented and an increase in HC and/or NOx exhaust emission is prevented.

While the present invention has been described in terms of a preferred embodiment and a modification thereof, it should be noted that the present invention is not limited to this embodiment and modification. Various changes and other modifications could be made by those skilled in the art without departing from the scope and spirit of the present invention as set forth in the attached claims.

What is claimed is:

1. A method of operating an internal combustion engine capable of running on gasoline and on a fuel mixture of gasoline and alcohol, comprising the steps of:
    (a) determining the proportion of alcohol in the fuel currently used by the engine, using a material which expands and contracts in accordance with the proportion of alcohol;
    (b) adjusting the amount of fuel supplied to the engine in accordance with said determined proportion; and
    (c) adjusting the timing of fuel supplied to the engine in accordance with said determined proportion.

2. A power boost device for a carburetor of an internal combustion engine of the kind which can be fueled by either gasoline or a gasoline-alcohol mixture, comprising:
    (a) a valve boss, the position of which determines the effective cross-sectional area of a passage connecting a fuel source and the engine;
    (b) a positioning element connected to said valve boss for controlling the position thereof, said positioning element composed of a material which expands and contracts in accordance with the alcohol concentration in the fuel; and (c) a secondary valve responsive to the intake manifold pressure of the engine for blocking the connection between the fuel source and said valve boss when the intake manifold pressure does not exceed a predetermined value.

3. A power boost device for a carburetor of an internal combustion engine which can be fueled by either pure gasoline or an alcohol-gasoline mixture, comprising:

a first valve responsive to intake manifold vacuum pressure and cooperative with an orifice to permit fuel flow therethrough when intake vacuum pressure exceeds a threshold value, said first valve comprising a hollow casing having said orifice, a valve boss movably closing an end of said orifice, said casing having an opening communicating with a fuel passage leading to the internal combustion engine; and means for biasing said valve boss into sealing contact with said end of said orifice, a second valve in series with said first valve and being responsive to the alcohol content of the fuel to adjust the amount of fuel passing therethrough, said second valve comprising an additional orifice and a valve member including a swelling portion, made of a material which expands on contact with alcohol to an extent dependent on the proportion of alcohol in the mixture with which it is in contact, said valve member having a portion extending loosely through said additional orifice.

4. A power boost device as set forth in claim 3, wherein said second valve is responsive to the alcohol content to increase the amount of fuel in response to an increase in the alcohol concentration of said fuel.

5. A power boost device for a carburetor with at least one fuel passageway leading to an internal combustion engine which can be fueled by either pure gasoline or an alcohol-gasoline mixture, comprising:

(a) a first valve responsive to intake manifold vacuum pressure and having a first orifice for permitting fuel flow therethrough;

(b) means for biasing said first valve to open when the intake manifold vacuum pressure excees a predetermined value;

(c) a second valve having a second orifice for metering fuel flowing through the first orifice, said second valve communicating with a fuel passageway leading to the internal combustion engine;

(d) means associated with at least one of said first and second valves for controlling the opening of said respective valves in response to the alcohol content of the fuel; and (e) wherein at least said first valve includes said controlling means responsive to the alcohol content of the fuel, said controlling means operative to adjust the timing of the opening of said first valve in relation to the time at which the intake manifold vacuum pressure reaches said predetermined value, whereby the amount of fuel supplied to the engine is adjusted in response to the alcohol content of the fuel.

6. A power boost device as set forth in claim 5, wherein said second valve also includes said controlling means responsive to the alcohol content of the fuel to adjust the amount of fuel metered therethrough.

7. A power boost device as set forth in either claims 5 or 6, wherein said second valve comprises:

(a) a hollow housing having a first tapered opening available to fuel flowing from the first orifice and a second opening communicating with the fuel passageway;

(b) a valve member tapered to match the first opening and in a spaced relationship therewith, the space therebetween constituting the second orifice;

(c) said controlling means of said second valve including:
  (1) a swelling member made of a material which expands upon contact with alcohol and contracts when removed from contact with alcohol, said swelling member connected to said housing and immersed in the fuel during operation thereof; and
  (2) means for connecting said valve member and said swelling member for transmitting the expansion and contraction of said swelling member to said valve member.

8. A power boost device as set forth in claim 7, wherein said swelling member comprises nitrile rubber.

9. A power boost device as set forth in claim 7, wherein said swelling member expands in proportion to the alcohol concentration of said fuel.

10. A power boost device as set forth in claim 9, wherein said first valve comprises:

(a) a hollow casing having said first opening;
(b) a valve boss within said casing;
(c) means for biasing said valve boss into sealing contact with the first orifice; and
(d) said controlling means of said first valve including:
  (1) an additional swelling member made of a material which expands upon contact with alcohol and contracts when removed from contact with alcohol, said additional swelling member positioned in spaced relationship with a vacuum piston movable in response to intake manifold vacuum pressure, said spacing determining said time of opening of said first valve;
  (2) a second shaft attached to said additional swelling member and said valve boss to adjust said spacing.

11. A power boost device as set forth in claim 10, wherein said swelling member expands in proportion to the alcohol concentration of said fuel.

12. A power boost device as set forth in claim 10, wherein said swelling member comprises nitrile rubber.

13. A power boost device for a carburetor of an internal combustion engine of the kind which can be fueled by either gasoline or a gasoline-alcohol fuel mixture, comprising:

(a) a power boost valve responsive to the intake manifold pressure of the engine for supplying fuel to the engine, the amount of fuel being dependent upon the intake manifold pressure; and (b) means responsive to the alcohol concentration in the fuel for adjusting the timing of fuel supplied by said valve in accordance with the alcohol concentration in the fuel.

14. The device of claim 13, wherein said power boost valve comprises:

(a) a valve boss, the position of which determines the effective cross-sectional area of a passage connecting a fuel source and the engine;

(b) means responsive to the alcohol concentration in the fuel for controlling the position of said valve boss in accordance with the alcohol concentration in the fuel; and (c) a secondary valve responsive to the intake manifold pressure for blocking the connection between the fuel source and said valve boss when the intake manifold pressure does not exceed a predetermined value.

15. The device of claim 14, wherein said secondary valve comprises:

(a) an actuator, the position of which is related to the intake manifold pressure; and (b) a secondary valve boss urged toward a first position in which the connection between the fuel source and the valve boss of said power boost valve is blocked and movable by said actuator away from the first position to allow communication between the fuel source and the valve boss of the power boost valve when the intake manifold pressure exceeds the predetermined value, and wherein said timing adjusting means comprises a spacer disposed between said actuator and said secondary valve boss and composed of a material which expands and contracts volumetrically in accordance with the alcohol concentration in the fuel.

16. The device of claim 14, wherein said controlling means of the power boost valve comprises an actuator connected to the valve boss of the power boost valve and composed of a material which expands and contracts in accordance with the alcohol concentration in the fuel.

* * * * *